Nov. 21, 1933.   J. W. SPEAKER   1,936,215
ELECTRIC COOKING STOVE
Filed May 21, 1930    2 Sheets-Sheet 1

Inventor
John W. Speaker
By his Attorneys
Williamson & Williamson

Nov. 21, 1933.   J. W. SPEAKER   1,936,215
ELECTRIC COOKING STOVE
Filed May 21, 1930   2 Sheets-Sheet 2

Inventor
John W. Speaker
By his Attorneys
Williamson & Williamson

Patented Nov. 21, 1933

1,936,215

UNITED STATES PATENT OFFICE 1,936,215

ELECTRIC COOKING STOVE

John Walter Speaker, Albert Lea, Minn., assignor to American Gas Machine Co., Inc., Albert Lea, Minn., a corporation of Delaware Application May 21, 1930. Serial No. 454,320

5 Claims. (Cl. 219—35)

My invention has for its object to provide an improved cooking stove and, to this end, my invention consists of the novel devices and combinations of devices hereinafter described and pointed out in the claims.

My improved stove is especially well adapted for the employment of an electric heater as the source of heat to be used, but some of the features could be used in a cooking stove which did not employ an electric heater. The preferred form of my improved stove does employ an electric heater and is illustrated in the accompanying drawings, wherein like notations refer to like parts throughout the several views.

In said drawings.

Figure 1:
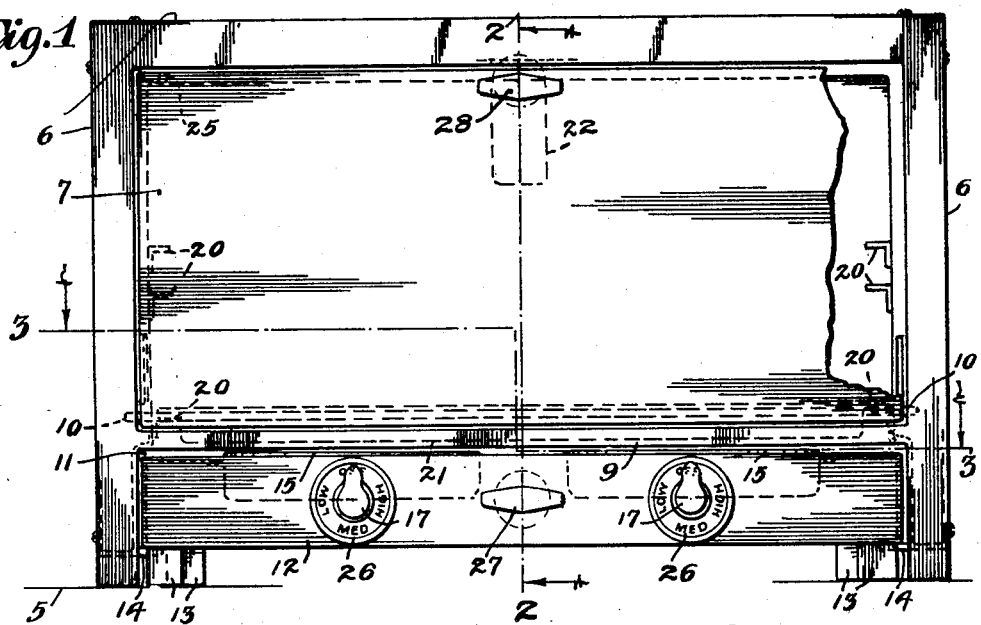
Fig. 1 is a front elevation of my improved electric cooking stove, with the electric heater in oven-heating position, some parts being broken away.
Figure 2:
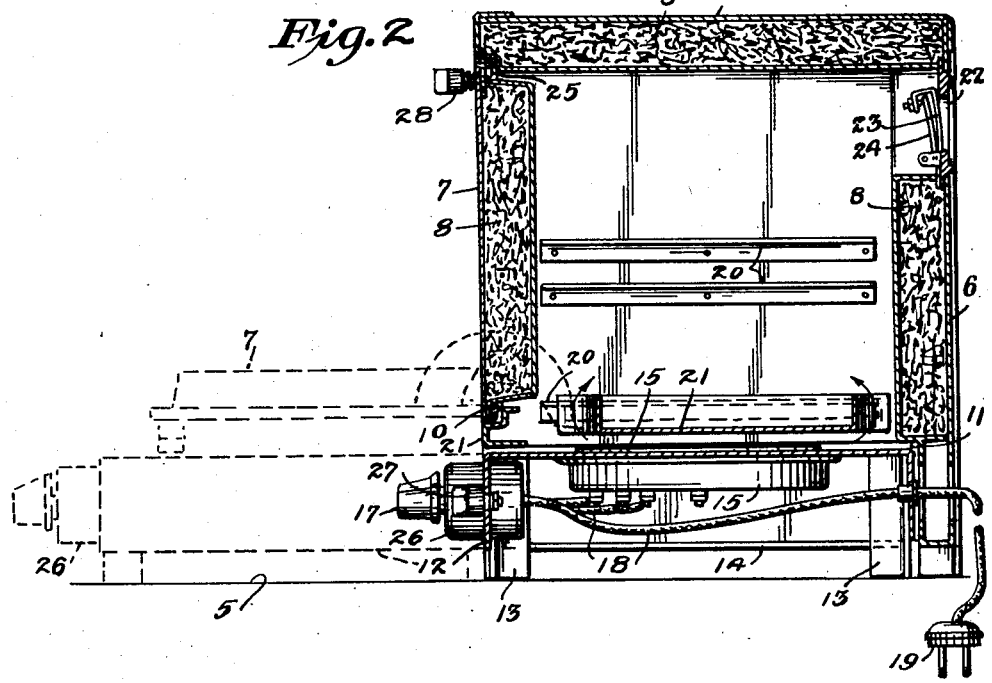
Fig. 2 is a vertical central cross section on the line 2—2 of Fig. 1, the full lines showing the parts in the same position as in Fig. 1, and the dotted lines showing the electric heater and its carrier moved to a position outside the oven and showing the door of the oven in its open position.
Figure 4:
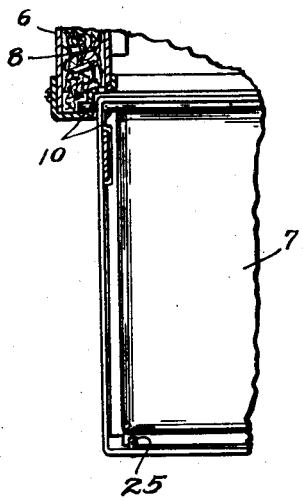
Fig. 4 is a view partly in horizontal section and partly in plan, showing the hinge rod which pivotally connects the door-wall of the oven with the fixed walls of the ends of the oven, the door being in its open position.

The numeral 5, in Figs. 1 and 2, represents the upper face of a table or other suitable support for the stove. The oven is of oblong rectangular shape and is open at its bottom. This oven has five walls, four of which are rigidly connected together and are marked with the numeral 6, and the fifth of which is pivotally connected to two of the end walls and is marked with the numeral 7, and serves as the door to the oven. All of the said walls, 6 and 7, are double, being made up of spaced plates, suitably held apart so as to afford between the same, spaces for insulating material 8. At the front of the stove, the end walls are connected by a cross bar 9, located directly below the hinge rod 10, which connects the door-wall 7 to the end walls of the oven. The end walls of the oven are flanged at their lower ends, as best shown in Fig. 4, and the inner, or pan shaped plate of the double wall-door 7 is also flanged at its lower end, as best shown in Fig. 2, and the said hinge rod 10 engages behind the lower flange of the said pan-shaped plate of the door 7 and helps to hold the two plates of the door together, and the said hinge rod 10 also extends through suitable bearing holes in the lower flanges of the end walls, as shown in Fig. 4, and thereby serves to pivotally connect the said door-wall 7 to the end walls of the oven.

The back wall and the two end walls of the oven have formed integral therewith, or secured thereto in any suitable way, downward extensions, which together, form a housing 11 underneath the oven and, which housing 11 is open at its front. The numerals 12 and 13 represent respectively the body portion and the corner posts of a heater carrier of inverted box-like shape adapted, in one of its working positions, to be encased within the said housing 11. The said corner posts 13 of said carrier extend downward below the body portion of the carrier and their lower ends rest upon the table or other support 5 for the stove. The said corner posts 13 are set inward a short distance from the ends of the body of the carrier and the housing 11 is provided with inwardly extending horizontal flanges 14 adapted to engage under the said outwardly projecting portions of the body of the carrier, as best shown in Fig. 1 of the drawings, thereby connecting said parts together in such a way that when the oven portion of the stove is lifted the said heater carrier will also be lifted with the oven.

Figure 3:
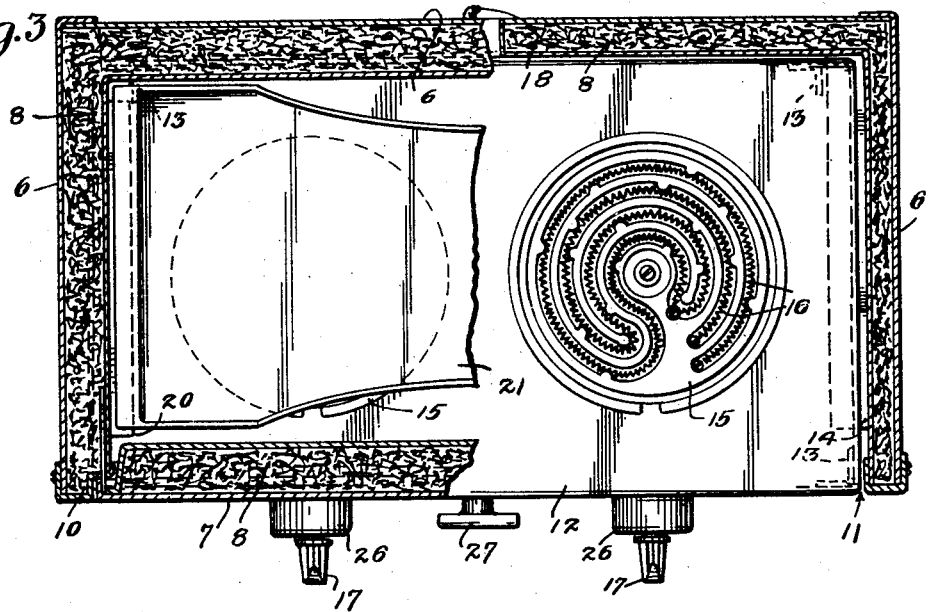
Fig. 3 is a longitudinal horizontal section on the line 3—3 of Fig. 1, with some parts broken away.

The said heater carrier, made up of said parts 12 and 13, is provided with electric heaters 15, of ordinary, conventional, well-known form, mounted in the top of the carrier, as best shown in Figs. 2 and 3, and the electric conductors 16 of these heaters 15 are adapted to be connected through suitable switches 17, with extensible conductors 18, shown as slack cables, having portions thereof mounted on and carried by the said carrier and provided at their rear end portions with plug-in contacts 19, adapted for connection to an ordinary light circuit. The electric conductors 16 of the heaters are so disposed in the hot plates of the heaters 15 and so related to each other that the amount of resistance to be thrown into the electric circuit may be varied to the extent of three steps by the proper manipulation of the movable parts of the switches 17.

Inasmuch as the front of the stove is open directly under the cross bar 9 connecting the end walls of the oven at the front of the stove, it follows that the heater carrier may be moved on the table 5 from the position shown in full lines in Figs. 1 and 2 to the position shown in dotted lines in Fig. 2 of the drawings. When the parts are in the position shown in full lines, in Figs. 1 and 2, the carrier will hold the hot plates of the electric heaters 15 directly below and near to the open bottom of the oven, in proper positions to heat the oven and whatever it contains when the current is turned on. On the other hand, if the said carrier and heaters be moved to the dotted line position, shown in Fig. 2 of the drawings, the heaters will be entirely outside of the oven and may there be used for cooking independently of the oven when the current is turned on. The end walls of the oven are shown as provided on their interior faces with sets of pan or grid-supporting cleats 20. Three sets of said cleats 20 are shown in Fig. 2 of the drawings, with one set thereof properly positioned to hold a roasting pan 21 within the oven at a level near to the hot plates of the electric heaters when these heaters and their carrier are in the position shown in Fig. 2. The other sets of said cleats 20 are located higher up on the end walls of the oven, in proper position to hold trays or grids for supporting dough or other material to be cooked at the higher level.

The roasting pan 21 is wider at its ends than in its median portions, its sides being curved inward on long arcs, so as to afford between its side flanges and the back and front walls of the oven plenty of space for the free passage of the heated air about the meat or other material being cooked in the said pan.

The back wall of the oven is provided, near its upper end, with an opening 22, which is normally closed by a pivoted damper 23, which is subject to a thermostat 24, which, under the action of the heat in the oven, will open the damper when some predetermined degree of heat within the oven has been reached.

Referring again to the door section 7, of the oven, attention has already been called to the details whereby the hinge rod 10 serves to hold the lower edge of the inner plate of that double wall-door tightly against the outer plate of the door. The upper edge of the inner plate of the door is also flanged and the outer plate of the door is provided with dowels 25 adapted to engage with said flange, as shown in Fig. 4 of the drawings, and thus cooperate with the said hinge rod 10 to hold the two plates of said door in proper working position with respect to each other.

The electric switches 17 above specified, are secured to the front wall of the carrier with the movable finger pieces of the switches projecting outward beyond the front wall of the said carrier, and movable over face plates 26 marked to indicate three positions of the movable members of the switches so as to connect up the electric conductors of the heaters in such a way as to give three different degrees of heat, such as low, high and medium.

The heater carrier is shown as provided on its front wall with a finger piece 27, for use in shifting the carrier and the electric heaters from their innermost to their outermost positions and vice versa. The door 7 has a turn-button catch 28 at its upper edge.

In view of the above described structure of my improved cooking stove, it must be obvious that it is cheap to make, comparatively light in weight, convenient to handle in a comparatively small space and highly efficient in service. The fact that the hollow double walls of the oven are filled with heat insulating material enables the oven to better hold the heat supplied from the heaters, thus effecting an economy in the amount of current needed for the desired work. The fact that the electric heaters can be used either directly under the oven or in a position outside the oven, greatly extends the range of usage to which the stove is adapted.

Of course it will be understood that more or less of the details of the structure can be changed without departing from the spirit of the invention herein disclosed and pointed out in the claims.

What is claimed is:—

1. In cooking stove structure, an oven having side and end walls, a closed top and an open bottom, a shallow housing below said oven, a heater carrier slidably mounted in said housing and having a heating unit mounted in the top thereof adapted to be positioned at the bottom of said oven for heating the same and adapted to be disposed forwardly and without said oven when said carrier is withdrawn forwardly and connections for said heating unit extensible with said carrier.

2. In an electric cooking stove, an oven having side, end and top walls and an open bottom, a housing below said oven for supporting the same some distance above a table or other supporting means, an electric hot plate snugly nested within said housing and extensible forwardly without said housing for cooking and means for effecting electrical connections to said hot plate both when said hot plate is in position within said housing and when the same is withdrawn for cooking therewithout.

3. In an electric cooking stove, an oven having vertical side and end walls, a closed top and an open bottom, a housing below the bottom of said oven having a doorway or opening at one side thereof, a heater carrier snugly fitting said housing and slidable relatively thereto for positioning below said oven or in a forwardly withdrawn position without said oven, an electrical heating element mounted on the top of said carrier and extensible electrical connections for operating said heater when the same is disposed below said oven or forwardly of the same.

4. In cooking stove structure, an oven having side and end walls, a closed top and an open bottom, a heater carrier slidably mounted below said oven and having an upper surface adapted to substantially close and form a bottom for said oven, a heating unit mounted in the upper portion of said carrier, said heater carrier being slidably extensible to be positioned outwardly and at one side of said oven for cooking in such position as well as for heating said oven when in retracted position.

5. In cooking stove structure, an oven having side and end walls, a closed top and an open bottom, a shallow housing below said oven, a heater carrier slidably mounted in said housing and having a heating unit mounted in the top thereof adapted to be positioned at the bottom of said oven for heating the same and adapted to be disposed forwardly and without said oven when said carrier is withdrawn forwardly, said heater carrier having a top in which said heating unit is mounted, the top of said carrier closing and forming a bottom for said oven when said carrier is in the retracted position.

JOHN WALTER SPEAKER.